United States Patent [19]

Carr et al.

[11] Patent Number: 4,595,218
[45] Date of Patent: Jun. 17, 1986

[54] INSULATIVE COUPLING

[75] Inventors: John F. Carr, Oak Lawn; Leonard J. Kowal, Prospect Heights; Albert J. Schwarz, Lincolnwood, all of Ill.

[73] Assignee: Imperial Clevite Inc., Glenview, Ill.

[21] Appl. No.: 520,494

[22] Filed: Aug. 4, 1983

[51] Int. Cl.⁴ .......................................... F16L 59/00
[52] U.S. Cl. ...................................... 285/47; 285/52; 285/354
[58] Field of Search .................... 285/52, 53, 54, 354, 285/50, 339, 47

[56] References Cited

U.S. PATENT DOCUMENTS

| | | | |
|---|---|---|---|
| 299,206 | 5/1884 | Deavs | 285/52 |
| 550,097 | 11/1895 | Clift | 285/353 |
| 2,278,479 | 4/1942 | Parker | 285/54 |
| 2,837,351 | 6/1958 | Bailey | 285/52 |
| 3,441,297 | 4/1969 | Koski | 285/342 |
| 3,517,950 | 4/1968 | Anderson | 285/52 |
| 3,960,394 | 6/1976 | Hübner et al. | 285/297 |
| 3,993,331 | 11/1976 | Schwarz | 285/373 |

FOREIGN PATENT DOCUMENTS

| | | | |
|---|---|---|---|
| 0089677 | 6/1921 | Switzerland | 285/52 |
| 0687910 | 2/1953 | United Kingdom | 285/52 |
| 8117598 | 3/1982 | United Kingdom | 285/339 |

Primary Examiner—Cornelius J. Husar
Assistant Examiner—Eric K. Nicholson
Attorney, Agent, or Firm—Russell E. Baumann

[57] ABSTRACT

An insulative coupling for coupling a first tube to a second tube for fluid flow therebetween. The coupling includes an insulative washer and an insulative bushing cooperating with a flange connector associated with one of the coupling body elements to provide an electrically insulative connection between the coupled tubes. An O-ring is utilized in conjunction with a face seal radially inwardly of the washer to provide a high pressure seal between the coupling elements. The washer and bushing include axially extending flange portions having snug fits with associated components of the coupling to provide for facilitated and accurate assembly.

21 Claims, 1 Drawing Figure

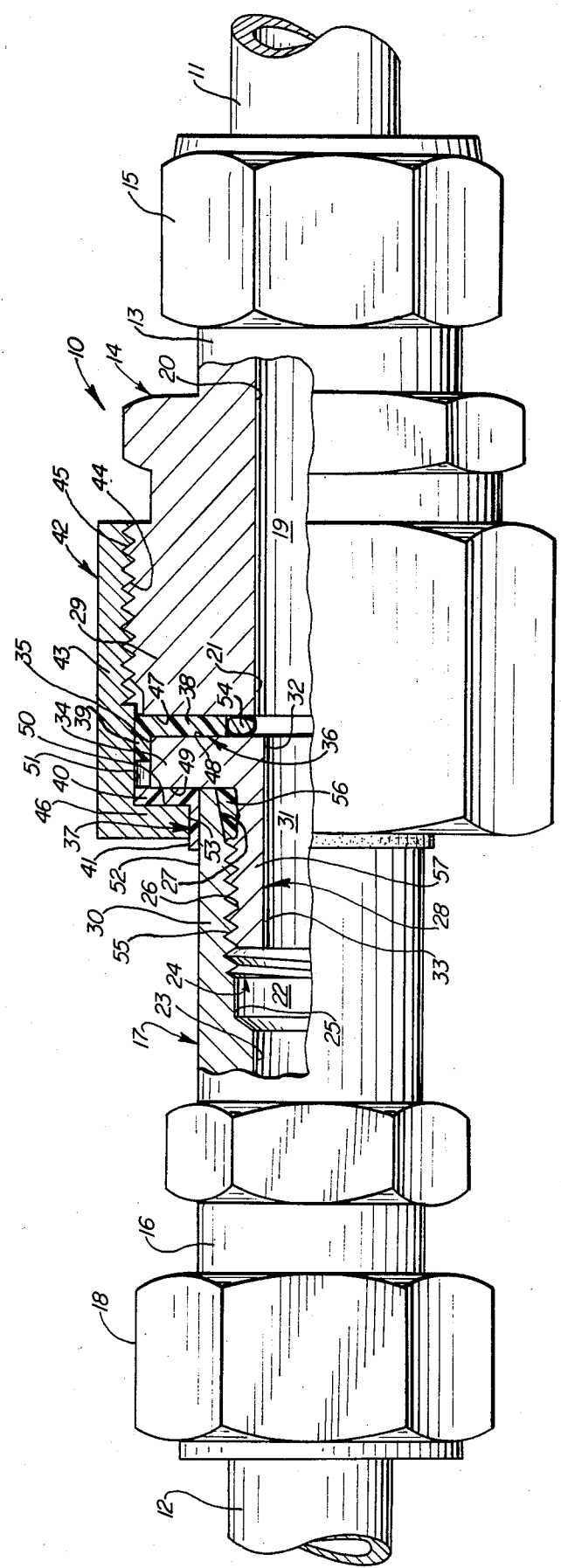

INSULATIVE COUPLING

DESCRIPTION

1. Technical Field

This invention relates to fluid couplings and in particular to insulative fluid couplings.

2. Description of Background Art

In one application, a coupling is provided for sealingly connecting metal tubes or pipes for conveying liquids or gases therethrough. In certain installations, the tubing may be connected to apparatus or devices at different electrical potentials, whereby an electric current may flow through the system.

In certain installations, as where the tubing system is buried under ground, electrical currents may be induced therein for a number of reasons. Illustratively, the tubing system may be in the path of ground currents, such as where an electrical device uses an earth return system. If the normal electrical return path is impeded or disrupted, such as by breaking or corrosion of the electrical return conductor, the current may use the buried tubing system as a return path conductor.

Such electrical current flow through tubing systems presents a serious problem in that it tends to erode or corrode the metallic parts of the system.

One attempted solution to this vexatious problem has been the provision of electrical insulators at spaced intervals in the tubing line. The currently available insulating devices of this type are relatively large and expensive, as they utilize relatively thick elastomeric members to provide fluid sealing and electrical insulation. Further, because the used seals are relatively large and soft, they are unable to withstand high pressures and, thus, cause an undesirable limiting of the pressure handling capability of the fluid flow system.

DISCLOSURE OF INVENTION

The present invention comprehends an improved insulative coupling for use in connecting and sealing a plurality of fluid flow tubes.

The improved coupling is arranged to withstand relatively high pressures, variable temperature conditions, and vibrations.

The coupling provides a positive, sealed connection between tubes notwithstanding the application of substantial forces and externally applied loads thereto.

The coupling utilizes O-ring seal means arranged to be protected against outside forces.

The coupling utilizes insulation which is subjected in the coupling primarily to compressive loads and which is effectively enclosed to prevent undesirable extrusion under load.

The coupling utilizes a novel O-ring face seal eliminating the need for the conventional sealing ring groove.

In the illustrated embodiment, the insulation is provided by means of cooperating washer and bushing elements.

In the illustrated embodiment, the washer further serves as means for locating the face seal O-ring and limiting outward extrusion thereof under pressure.

In the illustrated embodiment, each of the washer and bushing is provided with turned flanges received between confronting cooperating portions of the coupling for accurately fitting the insulating elements in the coupling.

The coupling structure is extremely simple and economical of construction while yet providing a highly improved insulative coupling in a novel manner.

BRIEF DESCRIPTION OF THE DRAWING

Other features and advantages of the invention will be apparent from the following description taken in connection with the accompanying drawing wherein the FIGURE is a fragmentary side elevation of a coupling embodying the invention, with portion broken away to illustrate a diametric section thereof.

BEST MODE FOR CARRYING OUT THE INVENTION

In the illustrative embodiment of the invention as disclosed in the drawing, an insulative coupling generally designated 10 is provided for coupling a first tube 11 to a second tube 12 for fluid flow therebetween. The end of tube 11 is sealingly connected to an outer end 13 of a first body 14 by means of a fitting nut 15 of a conventional sealing tube connector. The end of tube 12 is similarly connected to an outer end 16 of a second body 17 by a fitting nut 18 of a similar conventional tube connector fitting.

As shown in the drawing, first body 14 is provided with a through bore 19 having an outer end 20 communicating with tube end 11, and an inner end 21. Similarly, second body 17 is provided with a through bore 22 defining an outer end 23 in fluid communication with tubing 12, and a radially enlarged inner end 24. As shown, inner end 24 includes an outer, enlarged cylindrical portion 25, an intermediate threaded portion 26, and a frustoconical, inwardly widening inner portion 27.

Coupling 10 further includes an annular connector 28 received between the inner end 29 of first body 14, and inner end 30 of second body 17. Connector 28 defines a third through bore 31 having a first end 32 communicating with bore 19 of first body 14, and a second end 33 communicating with the second bore 22 of second body 17 for providing fluid flow connection between bores 19 and 22, and thus, between tubes 11 and 12.

Means are provided for removably sealingly securing the connector 28 to the second body 17 which, in the illustrated embodiment, comprise a threaded tubular outer portion 55 of the connector threaded to the threaded portion 26 of the second body bore 22, and a sealing ring 56. The connector further includes axially inner, radially outturned portion 34 defining a peripheral cylindrical surface 35.

Means are provided for electrically insulatively securing the connector to the coupling body 14 including an annular insulative washer 36 and an annular insulative bushing 37. The washer includes an annular disc portion 38 and a radially outer peripheral turned flange 39. The bushing includes an annular disc portion 40 and a radially inner turned flange 41.

A tubular nut 42 includes a first portion 43 having a female thread 44 threaded to a male thread 45 on first body 14. The nut further defines a radially inwardly turned flange 46.

As shown in the drawing, washer disc portion 38 is compressed between a planar body inner end surface 47 and a confronting planar connector surface 48. The bushing disc portion 40 is compressed between a planar outer surface 49 of connector portion 34 and a planar inner surface 50 of nut flange 46, as an incident of the threaded tightening of the nut 42 on the body thread 45.

Washer flange 39 has a snug fit radially outwardly with a cyindrical inner surface 51 of nut first portion 43 outwardly of the threaded portion 44, and a snug fit radially inwardly with the peripheral surface 35 of connector portion 34. Bushing flange 41 has a snug fit radially inwardly with the outer surface 52 of inner end portion 30 of second body 17 and a snug fit radially outwardly with the radially inwardly facing distal end surface 53 of the nut flange 46.

Each of the washer and bushing are formed of electrically insulative material and, thus, cooperatively define means for electrically insulating the first body and nut from the connector and the nut from the second body and connector.

As further shown in the drawing, an O-ring 54 is sealingly compressed between first body surface 47 and connector flange surface 48 radially inwardly of the washer disc portion 38, as a further incident of the threaded tightening of the nut on the first body thread 45. The undistorted cross-sectional diameter of the O-ring is preferably greater than the uncompressed thickness of the gasket disc portion 38, whereby the O-ring is substantially compressed prior to the compression of the gasket portion 38, assuring a positive, high pressure seal by the O-ring. Outward expansion of the O-ring is limited by the washer portion 38, as seen in the drawing, and thus, the invention comprehends a novel face seal arrangement avoiding the need for an O-ring groove or the like, while yet providing a positive, high pressure seal in the coupling.

As further shown in the drawing, the connector defines an axially outwardly extending stem portion 57 which radially outwardly defines the thread 55. The seal 27 is captured between the stem 57, connector flange portion 34, and the bevel surface 27 at the inner end of the second body bore 22. The sealed compression of the sealing ring 56 against these surfaces is effected by the controlled threading of the stem portion 57 into the body thread 26.

In the illustrated embodiment, the body 14, body 17, connector 28, and nut 42 are formed of metal, such as Type 316 stainless steel. The washer 36 is formed of a strong insulating material, such as glass cloth reinforced epoxy resin. The bushing is formed of a strong insulating material, such as compressed fiber or acetyl copolymer thermoplastic. In the illustrated embodiment, the O-ring 54 has a 1/16" nominal cross section, and the washer disc portion 38 has an uncompressed thickness of 0.040".

The invention comprehends that the nut flange 46 have a preselected resilient deformability as a result of the tightening of the nut on the body thread 45. This is effected in the coupling 10 by controling the thickness of the nut outwardly of surface 51. In the illustrated embodiment, desirable resilient yieldability is provided by providing a nut having a ⅝-18UN internal screw thread made of 1-1/16" hexagonal-type 3/16 stainless steel rod and tightened on the body thread to a torque of 60 foot-pounds.

In the illustrated embodiment, seal 56 comprises an elastomeric O-ring. However, as will be obvious to those skilled in the art, other sealing means may be employed, such as a metal-to-metal face seal, edge or tapered seal, or the use of liquid thread staking compound.

The coupling is adapted for facilitated assembly while yet providing positive, high pressure seal and electrical insulation between the coupled tubes 11 and 12. The assembly is effected by first assembling the nut, bushing, connector and seal 56 to the second body 17. The insulating washer 36 is next fitted against the connector surfaces 48 and 35 and the nut flange 51 is brought against the bushing portion 40. The O-ring 54 is positioned inside the bore of the washer portion 38 and body 14 is then screwed into the nut and tightened until the O-ring is compressed and the washer portion 38 is placed under the desired compressive load.

The foregoing disclosure of specific embodiments is illustrative of the broad inventive concepts comprehended by the invention.

We claim:

1. An insulative coupling for coupling a first tube to a second tube for fluid flow therebetween, said coupling comprising:

a first body defining a first through a bore having an axially outer end and an axially inner end;

means for connecting the first tube sealingly to said outer end of the first body to have fluid flow communication with said first bore;

a second body defining a second through bore having an axially outer end and a radially enlarged axially inner end;

means for connecting the second tube sealingly to said outer end of the second body to have fluid flow communication with said second bore;

an annular connector received between said inner end of the first body and said inner end of the second body, and defining a third through bore having a first axial end communicating with said first bore and a second axial end communicating with said second bore for providing a fluid flow connection therebetween;

means for removably sealingly securing said connector to said second body; and means for electrically insulatively securing said first body to said second body comprising an annular insulative washer, an annular insulative bushing formed of synthetic resin, a tubular nut having a first portion having threaded means removably threaded about said first body, and a radially inwardly turned flange, said washer being compressed between said first body and said connector and said bushing being compressed between said nut flange and said connector as an incident of threaded tightening of said nut first portion to said first body, said washer defining means for electrically insulating said first body and nut from said connector, and said bushing defining means for electrically insulating said nut from said second body and connector, said washer and bushing defining a gap radially outwardly of said connector for accomodating expansion of said washer toward said bushing, and an insulative O-ring exposed to the communicating bores and being sealingly compressed between said first body and connector radially inwardly of and outwardly abutting said washer as a further incident of said threaded tightening of said nut first portion to said first body, said washer being inwardly exposed to fluid in said bores.

2. The insulative coupling of claim 1 wherein said connector includes an axially outer stem portion received in said inner end of said second through bore.

3. The insulative coupling of claim 1 wherein said connector includes an axially outer stem portion received in said inner end of said second through bore, and a flange comprising an axially inner, radially outturned portion of said connector.

4. The insulative coupling of claim 1 wherein said washer has a radially outer peripheral portion having a close fit with said nut first portion.

5. The insulative coupling of claim 1 wherein said bushing has a radially inner annular portion having a close fit with said second body.

6. The insulative coupling of claim 1 wherein said bushing has an axial thickness less than the cross-sectional diameter of the O-ring.

7. The insulative coupling of claim 1 wherein said nut flange is resiliently deflectibly connected to said nut first portion for maintaining sealing compression of said O-ring between said connector and said first body.

8. The insulative coupling of claim 1 wherein said connector and first body define axially spaced confronting planar surfaces, said O-ring being sealingly compressed between said planar surfaces.

9. The insulative coupling of claim 1 wherein said connector and first body define axially spaced confronting planar surfaces, said O-ring being compressed between said planar surfaces and said washer defining means for limiting radial expansion of the compressed O-ring.

10. The insulative coupling of claim 1 wherein said washer is formed of fiber-reinforced synthetic resins.

11. The insulative coupling of claim 1 wherein said bushing is formed of matted fibers.

12. The insulative coupling of claim 1 wherein said bushing is formed of a fiber-reinforced synthetic resin.

13. An insulative coupling for coupling a first tube to a second tube for fluid flow therebetween, said coupling comprising:
   a first body defining a first through bore having an axially outer end and an axially inner end;
   means for connecting the first tube sealingly to said outer end of the first body to have fluid flow communication with said first bore;
   a second body defining a second through bore having an axially outer end and a radially enlarged axially inner end;
   means for connecting the second tube sealingly to said outer end of the second body to have fluid flow communication with said second bore;
   an annular connector received between said inner end of the first body and said inner end of the second body, and defining a third though bore having a first axial end communicating with said second bore for providing a fluid flow connection therebetween;
   means for removably sealingly securing said connector to said second body; and
   means for electrically insulatively securing said first body to said second body comprising an insulative washer having an annular disc portion having a radially outer peripheral turned flange, an annular insulative bushing having an annular disc portion having a radially inner turned flange, a tubular nut having a first portion having threaded means removably threaded about said first body, and a radially inwardly turned flange, said washer disc portion being compressed between said first body and said connector and said bushing disc portion being compressed between said nut flange and said connector as an incident of threaded tightening of said nut first portion to said first body, said washer flange being received radially between said nut first portion and the periphery of said connector, and said bushing flange being received radially between the nut flange and the second body, said washer defining means for electrically insulating said first body and nut from said connector, and said bushing defining means for electrically insulating said nut from said second body and connector, and an insulative O-ring exposed to the communicating bores and being sealingly compressed axially between said first body and connector radially inwardly of said washer disc portion as a further incident of said threaded tightening of said nut first portion to said first body, said washer being inwardly exposed to fluid in said bores.

14. The insulative coupling of claim 13 wherein said washer flange has a close fit with said nut portion intermediate said threaded means and said nut flange.

15. The insulative coupling of claim 13 wherein said bushing flange has a close fit with said connector.

16. The insulative coupling of claim 13 wherein said connector defines an axially inner, radially outturned flange disposed between said washer and bushing disc portions.

17. The insulative coupling of claim 13 wherein said connector defines an axially inner, radially outturned flange disposed between said washer and bushing disc portions and defining a peripheral surface having a close fit with said washer turned flange.

18. The insulative coupling of claim 13 wherein said connector defines an axially inner, radially outturned flange disposed between said washer and bushing disc portions, said means for sealingly securing said connector to said second body comprising annular sealing means providing a seal between said connector flange and said second body.

19. The insulative coupling of claim 13 wherein said connector defines an axially inner, radially outturned flange disposed between said washer and bushing disc portions, said inner end of the bore of said second body defining a distal tapered sealing surface, and said means for sealingly securing said connector to said second body comprises annular sealing means providing a seal between said connector flange and said tapered sealing surface.

20. The insulative coupling of claim 13 wherein said washer flange has a close fit radially inwardly with said connector and radially outwardly with said nut.

21. The insulative coupling of claim 13 wherein said bushing flange has a close fit radially inwardly with said second body and radially outwardly with said nut flange.

* * * * *